United States Patent [19]

Yamamoto et al.

[11] Patent Number: 4,526,875
[45] Date of Patent: Jul. 2, 1985

[54] CERAMIC MATERIAL FOR CUTTING TOOLS AND PROCESS FOR THE PRODUCTION THEREOF

[75] Inventors: Yoshihiro Yamamoto; Kenji Sakurai, both of Aichi, Japan

[73] Assignee: NGK Spark Plug Co., Ltd., Aichi, Japan

[21] Appl. No.: 569,943

[22] Filed: Jan. 13, 1984

Related U.S. Application Data

[63] Continuation of Ser. No. 386,369, Jun. 8, 1982, abandoned.

[30] Foreign Application Priority Data

Jun. 8, 1981 [JP] Japan .................................. 56-87711

[51] Int. Cl.³ ...................... C04B 35/10; C04B 35/52; C04B 35/58
[52] U.S. Cl. ........................................ 501/87; 51/309; 501/96; 501/98; 264/65
[58] Field of Search ............... 501/87, 96, 98; 51/309; 264/65

[56] References Cited

U.S. PATENT DOCUMENTS

| | | | |
|---|---|---|---|
| 3,669,695 | 6/1972 | Iler et al. | 501/87 |
| 4,204,873 | 5/1980 | Yamamoto et al. | 501/98 |
| 4,249,914 | 2/1981 | Ogawa et al. | 51/309 |
| 4,320,203 | 3/1982 | Brandt et al. | 501/87 |
| 4,325,710 | 4/1982 | Tanaka et al. | 51/309 |

FOREIGN PATENT DOCUMENTS

| | | | |
|---|---|---|---|
| 55-126567 | 9/1980 | Japan | 501/98 |
| 55-126566 | 9/1980 | Japan . | |
| 55-158162 | 12/1980 | Japan | 501/98 |
| 56-9274 | 1/1981 | Japan | 501/98 |
| 56-17978 | 2/1981 | Japan | 501/98 |
| 56-17979 | 2/1981 | Japan . | |

*Primary Examiner*—Mark L. Bell
*Attorney, Agent, or Firm*—Sughrue, Mion, Zinn, Macpeak & Seas

[57] ABSTRACT

Ceramic materials for cutting tools are described, comprising molding a powder mixture comprising (a) $Al_2O_3$, (b) TiN, and (c) at least one of ZrC, Zr, and ZrN, wherein component (a) constitutes between 25 and 80% of the total volume of the powder mixture and the volume ratio of component (c) to component (b) is $\frac{1}{2}$ or less, and sintering the molded powder in vacuum or in an inert atmosphere. A process for production thereof is also described.

3 Claims, 2 Drawing Figures

CERAMIC MATERIAL FOR CUTTING TOOLS AND PROCESS FOR THE PRODUCTION THEREOF

This application is a continuation of application Ser. No. 386,369, filed June 8, 1982, now abandoned.

FIELD OF THE INVENTION

The present invention relates to a novel ceramic material for cutting tools and a novel process for the production thereof, and more particularly, to $Al_2O_3$-TiN-based ceramics and a process for the production thereof at low cost by the use of a powder metallurgical method instead of a hot pressing method which has heretofore been used.

BACKGROUND OF THE INVENTION

Ceramic tools have recently been used for cutting high hardness materials such as roll materials. In this cutting processing, however, since the hardness of the work piece is very high, the cutting edge becomes hot. With the conventional high purity alumina tools, therefore, plastic deformation and chipping abrasion of the cutting edge occur because their thermal conductivity is small.

The specific example of the roll material involves Nodular cast iron and the composition thereof contains 3.0 to 3.3% by weight of C, 0.68% by weight of Cr, 3.5% by weight of Ni, 0.65% by weight of Mo and the balance Fe.

It is known, as described in Japanese Patent Application (OPI) No. 89410/75 (the term "OPI" is used herein to mean a "published unexamined Japanese patent application"), that $Al_2O_3$-TiN-based ceramic tools prepared by sintering an $Al_2O_3$/TiN mixture (with a TiN content of from 5 to 40% by volume) by a hot pressing method or a hot isostatic pressing method (HIP process) have very high antioxidation and anticrator wear properties and are excellent as cutting tools. However, since the hot pressing method involves a combination of steps of molding and sintering a starting mixture in a graphite mold and of cutting and working the thus obtained ceramic plate with a diamond whetstone, it suffers from the disadvantage that when used for commercial production, it increases production costs, and therefore the hot pressing method is not suitable for mass production. The HIP process generally involves a step pressing a molded article to be sintered or a sintered article with pressurized gas to prepare a dense product. When the molded article or a sintered article is porous because the pressurized gas permeates inside the article, the article cannot be densified at all. Therefore, it is necessary to apply the HIP process after covering the surface of the article or previously sintering the article to density of at least 95% wherein closed air pores are formed. This makes difficult the commercial production of ceramic tools by the HIP process.

Japanese Patent Application (OPI) No. 126566/80 discloses a process for the production of ceramic materials for cutting tools, containing from 80 to 95% $Al_2O_3$, with the balance being TiN, ZrC, Zr, and/or ZrN. These ceramics, however, are also not satisfactory in performance; for example, thermal conductivity thereof is small because of the small amount of TiN added to increase the thermal conductivity, and the strength is insufficient when the ceramic materials are used for cutting of high hardness materials such as roll materials, even though the plastic deformation and chipping abrasion properties of the cutting edge is considerably increased over conventional high purity alumina tools.

SUMMARY OF THE INVENTION

An object of the invention is to provide ceramic materials for cutting tools produced by a powder metallurgical method.

An object of the invention is to provide ceramic materials for cutting tools which exhitit satisfactory performance, e.g., sufficient thermal conductivity and high strength.

A further object of the invention is to provide a process for the production of ceramics for cutting tools by a powder metallurgical method.

A still further object of the invention is to provide a process for the production of ceramics for cutting tools, which exhibit satisfactory performance, e.g., sufficient thermal conductivity and high strength.

As a result of extensive study on a process for the production of $Al_2O_3$-TiN-based ceramics by the use of a powder metallurgical method in place of the hot pressing method or HIP process, it has been found that the use of particular proportions of materials, including at least one of ZrC, Zr, and ZrN permits the mass production of ceramics as described above by the use of a vacuum or inert gas sintering furnace according to the conventional powder metallurgical method. Therefore, in accordance with the present invention, a ceramic material is provided comprising a mold of a powder mixture comprising (a) $Al_2O_3$, (b) TiN, and (c) at least one of ZrC, Zr, and ZrN, wherein component (a) constitutes between 25 and 80% of the total volume of the powder mixture and the volume ratio of component (c) to component (b) is ½ or less.

The invention also relates to a process for producing a ceramic material for a cutting tool, comprising molding a mixed powder containing (a) between 25 and 80% by volume $Al_2O_3$, with the balance being (b) TiN and (c) at least one of ZrC, Zr, and ZrN and the volume ratio of component (c) to component (b) is ½ or less, and sintering the molded powder in vacuum or in an inert atmosphere.

DETAILED DESCRIPTION OF THE INVENTION

Hereinafter the invention is explained in greater detail.

The reason why the sintering is conducted in vacuum or in an inert atmosphere according to the present invention is that components (b) and (c) are easily oxidizable. The sintering is usually performed at from 1,550° to 1,750° C. and preferably at from 1,600° to 1,700° C. At temperatures lower than 1,600° C., the sintering is sometimes insufficient, whereas at higher temperatures than 1,700° C., the growth of grains easily proceeds, degrading physical properties and cutting characteristics.

Among the component (c), ZrC is preferred.

In addition to the components (a), (b) and (c) described herein, additives such as MgO, CaO, $ZrO_2$, $SiO_2$ and $Y_2O_3$, which are typically used for the sintering of $Al_2O_3$ may also be incorporated in the ceramic material.

The following examples are given to illustrate the invention in greater detail.

EXAMPLE 1

Figure 1:
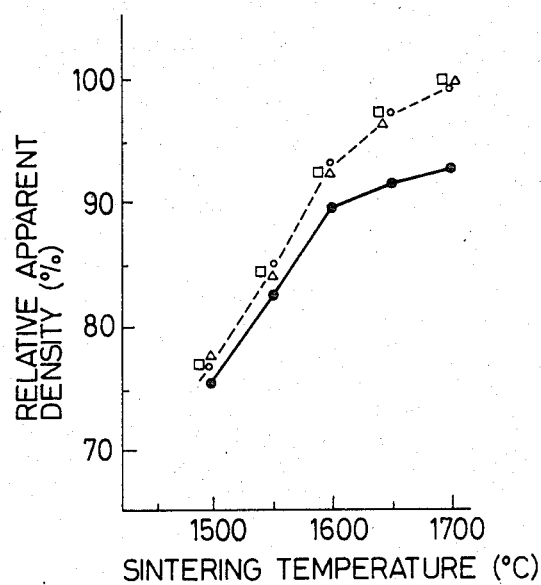
FIG. 1 is a graph showing the relation between sintering temperature and relative apparent density of the ceramic materials of Example 1.

A powder mixture consisting of 54.6% by volume of $Al_2O_3$ powder, 0.4% by volume of MgO powder, 43% by volume of TiN powder, and 2% by volume of one of ZrC, Zr and ZrN, all of which are commercially available, was placed in a stainless mill and ball-milled for 40 hours together with super hard steel alloy balls and alcohol. After volatilization of the alcohol, 2% camphor was added as a molding aid. Thereafter, the mixture was molded at a pressure of 2 ton/cm² in a mold which had been chosen taking into account the degree of shrinkage expected so as to produce a 13×13×5 mm sintered product after the molded article was fired. After the removal of the camphor by heating up to about 400° C., the molded article was placed in a vacuum sintering furnace (graphite heater) and sintered in an argon atmosphere of 100 torr at 1,500° to 1,700° C. for 1 hour. At each sintering temperature, the relative apparent density of the sintered product was measured, and the results are shown in FIG. 1. In FIG. 1, the symbols , Δ and □ indicate the sintered products in which ZrC, Zr, and ZrN were used, respectively, and the symbol ● indicates a sintered product in which none of ZrC, ZrN, or Zr was added.

The relative apparent density was measured as follows:

Assuming that the measured value of apparent density of a sintered product obtained by sintering a mixture consisting of:

| | |
|---|---|
| $Al_2O_3$ | a (% by weight) |
| TiN | b (% by weight) |
| One of ZrC, Zr and ZrN | c (% by weight) | is d', the theoretical density d is as follows:

$$d = \frac{a + b + c}{\frac{a}{\rho a} + \frac{b}{\rho b} + \frac{c}{\rho c}}$$

wherein $\rho a$, $\rho b$, and $\rho c$ indicate the densities, respectively, of (a) $Al_2O_3$, (b) TiN, and (c) ZrC, Zr, and ZrN.

Therefore, the relative density is $$\frac{d'}{d} = \frac{\left(\frac{a}{\rho a} + \frac{b}{\rho b} + \frac{c}{\rho c}\right) d'}{\rho a + \rho b + \rho c} \times 100$$

Although ZrC, Zr and ZrN were added singly to $Al_2O_3$ and TiN in the above case, when they were added as a mixture comprising two or three thereof with the proviso that the total amount is 2% by volume, results similar to those when they were added singly were obtained.

FIG. 1 demonstrates that the addition of ZrC, Zr or ZrN in a very small amount such as 2% by volume, results in a marked increase in the relative apparent density. The reasons for this are believed to be as follows:

(1) Conversion of a part of ZrC, Zr and ZrN into $ZrO_2$ occurs during the step of sintering, accelerating the sintering.

(2) Intermediate products are formed between the ZrC, Zr, and ZrN and the lower oxides (e.g., ZrO) or oxides (e.g., $ZrO_2$) improving adhesion between $Al_2O_3$ and TiN.

When at least one of ZrC, Zr, or ZrN are not added, the growth of grains proceeds drastically, plugging voids, and even if the sintering temperature is further increased, the density does not further increase.

EXAMPLE 2

Figure 2:
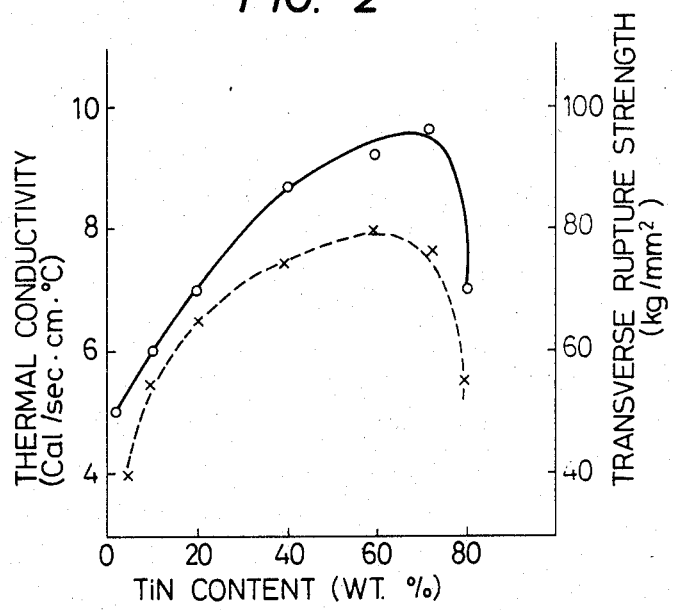
FIG. 2 is a graph showing the relation between TiN content and thermal conductivity and transverse rupture strength of the ceramic materials of Example 2.

A powder mixture was prepared using the same materials as used in Example 1 in which 20% by volume of TiN was replaced by ZrC, and the TiN and $Al_2O_3$, with 0.5% by volume of MgO, were compounded so that $TiN/Al_2O_3 = 5/95$ to 80/20. The powder mixture was sintered at from 1,600° to 1,700° C. for 2 hours in the same manner as in Example 1. The sintered product thus prepared was measured in thermal conductivity (K) and transverse rupture strength (TRS), and the relationship of TiN content and the thermal conductivity is shown in FIG. 2 as a solid line and the relationship of TiN content and the transverse rupture strength is shown in FIG. 2 as a dotted line. The deflective strength was measured according to JIS B4104 (1970). It can be seen from FIG. 2 that within the range of $TiN/Al_2O_3$ of from 20/80 to 75/25 falling within the scope of the present invention, both the transverse rupture strength and thermal conductivity are high. This clearly indicates that the thermal impact resistance is high within the above range. The reason for this is that the thermal impact resistance is in inverse proportion to the coefficient of thermal expansion and Young's modulus, and is in proportion to transverse rupture strength and thermal conductivity.

EXAMPLE 3

$Al_2O_3$, TiN, ZrC, Zr, and ZrN, and having the characteristics shown in Table 1 below, were mixed in predetermined mixing ratios as shown in Table 2 below. The mixture was then molded and camphor was removed therefrom in the same manner as in Example 1. The mold was raised in temperature to 1,250° C. at a pressure of from $5 \times 10^{-2}$ to $1 \times 10^{-1}$ mmHg, and maintained at 1,250° C. for 30 minutes. Thereafter, argon gas was introduced at 50 mmHg, and the mold was raised in temperature to 1,650° C. and sintered at 1,650° C. for 4 hours. The sintered product was worked with a diamond whetstone to provide a square chip having a size of 12.7×12.7×4.8 mm, a nose diameter of 0.8 mm and a chamfer of 25°×0.10 mm. The chip was measured in physical properties and cutting properties. The results are shown in Table 2.

TABLE 1

| | Purity (%) | Carbon Content (%) | Nitrogen Content (%) | Mean Grain Size (μ) | Remark |
|---|---|---|---|---|---|
| $Al_2O_3$ | 99.99 | | | 0.3 | 1% MgO added |
| TiN | | | 21.7 | 1.2 | |
| ZrC | | 11.6 | | 1.4 | |
| ZrN | | | 13.2 | 1.2 | |

TABLE 1-continued

| | Purity (%) | Carbon Content (%) | Nitrogen Content (%) | Mean Grain Size (μ) | Remark |
|---|---|---|---|---|---|
| Zr | 99.8 | | | 3.5 | |

TABLE 2

| Sample | Composition (% by volume) | | | | | Relative Density (%) | Rockwell Hardness (45N) | Mean Grain Size (μ) | Cutting Test $V_B$ (mm) | Comments |
|---|---|---|---|---|---|---|---|---|---|---|
| | Al$_2$O$_3$ | TiN | ZrC | ZrN | Zr | | | | | |
| A | 73 | 22 | 5 | | | 98.9 | 89.5 | 1.6 | 0.16 | Product of the invention |
| B | 68 | 25 | | 7 | | 99.2 | 89.3 | 1.7 | 0.18 | Product of the invention |
| C | 68 | 22 | 5 | | 5 | 98.5 | 89.7 | 1.6 | 0.17 | Product of the invention |
| D | 60 | 30 | | 5 | 5 | 99.3 | 90.0 | 1.4 | 0.15 | Product of the invention |
| E | 60 | 32 | 8 | | | 99.0 | 89.6 | 1.6 | 0.14 | Product of the invention |
| F | 45 | 42 | 3 | | 10 | 98.9 | 90.2 | 1.3 | 0.12 | Product of the invention |
| G | 35 | 50 | 15 | | | 98.8 | 89.2 | 1.5 | 0.13 | Product of the invention |
| H | 28 | 55 | 17 | | | 98.2 | 88.9 | 1.8 | 0.12 | Product of the invention |
| I | 28 | 55 | 13 | 4 | | 98.5 | 89.0 | 1.7 | 0.12 | Product of the invention |
| J | 85 | 11 | | 4 | | 99.1 | 89.8 | 1.9 | 0.28 | Outside of the range of the invention |
| K | 45 | 20 | 30 | | 5 | 96.5 | 87.0 | 2.1 | breakdown at 55 sec. | Outside of the range of the invention |
| L | 35 | 25 | 40 | | | 96.3 | 86.6 | 2.5 | breakdown at 35 sec. | Outside of the range of the invention |
| M | 10 | 80 | 10 | | | 97.5 | 87.8 | 2.0 | 0.38 | Outside of the range of the invention |
| N | 60 | 40 | | | | 99.3 | 88.4 | 2.6 | 0.30 | Sintered by hot pressing |

In Table 2, Vb indicates the amount of Flank wear after cutting for 4 minutes, and the cutting test was conducted under the following conditions:

| Testpiece | SKD 11 (H$_{RC}$63) 140 φ × 200 l bar-member |
|---|---|
| Machine | Lathe |
| Cutting Speed | 100 m/min. |
| Feed | 0.2 mm/rev |
| Depth of Cut | 0.5 mm |
| Determination of Life | Determined by the amount of Flank wear after cutting for 4 minutes. |

It can be seen from Table 2 that Samples A to I, in which each component is present within the range defined for the invention, exhibit excellent characteristics and cutting life compared with Samples J to M, in which at least one of the components is outside of the range of the invention, and Sample N, in which a mixture of known composition was hot pressed. SKD 11 is a kind of special tool steel defined in JIS G4404 (1972) and the composition thereof contains 1.4 to 1.6% by weight of C, 11 to 13% by weight of Cr, 0.8 to 1.2% by weight of Mo, 0.2 to 0.5% by weight of V, the balance Fe.

It is clear from the foregoing examples that the proportion of the Al$_2$O$_3$ component should be within the range between and 25 to 80% by volume. When it is less than 25% by volume, sintering properties are poor. On the other hand, when it is at least 80% by volume, thermal conductivity and transverse rupture strength are insufficient, such that in the cutting of high hardness materials exemplified by roll materials, plastic deformation and chipping abrasion of the cutting edge occur. Also, the proportion of component (c), viz., ZrC, Zr, and/or ZrN, should be such that the volume ratio of component (c) to component (c), viz., is ½ or less. At higher proportions sintering properties are poor, and the sintered product cannot be used as a cutting tool.

As described above, the process of the invention enables the production of Al$_2$O$_3$-TiN-based ceramic materials, which have very satisfactory performance characteristics.

While the invention has been described in detail and with reference to specific embodiment thereof, it will be apparent to one skilled in the art that various changes and modifications can be made therein without departing from the spirit and scope thereof.

What is claimed is:

1. A ceramic material of high strength and sufficient thermal conductivity for a cutting tool consisting essentially of a sintered molded powder mixture consisting essentially of (a) Al$_2$O$_3$, (b) TiN, and (c) at least one of ZrC, Zr, and ZrN, wherein component (a) constitutes between 25 and 65% of the total volume of the powder mixture and the volume ratio of component (c) to component (b) is ½ or less.

2. A ceramic material as in claim 1, wherein component (a) constitutes from 30 to 65% of the total volume of the molded powder and component (c) is ZrC or Zr.

3. A ceramic material as in claim 1 or 2, wherein the ceramic material is sintered at a temperature of from 1,600° C. to 1,700° C.

* * * * *